Patented Feb. 19, 1924.

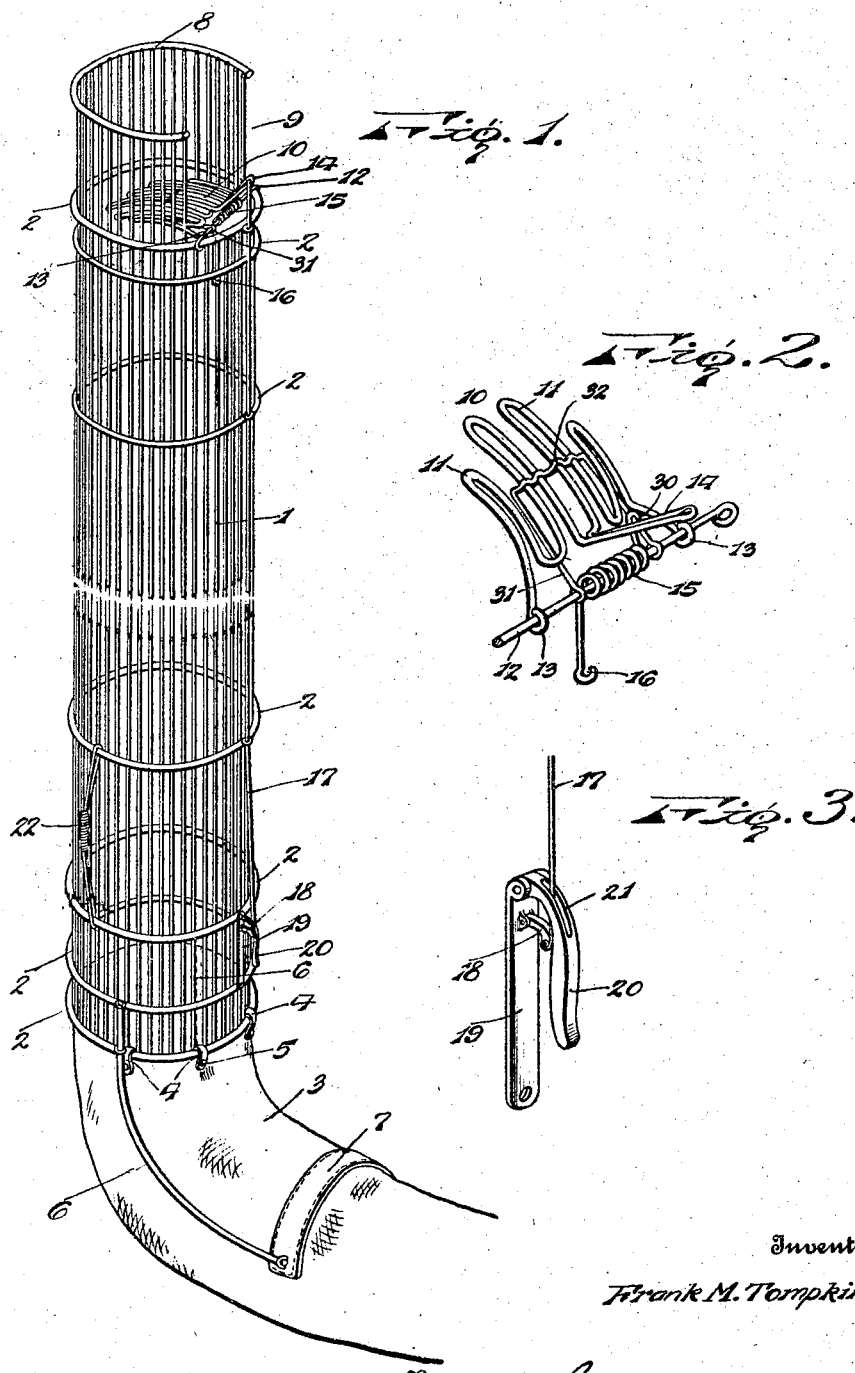

1,484,241

UNITED STATES PATENT OFFICE.

FRANK M. TOMPKINS, OF DUFFIELD, VIRGINIA.

FRUIT PICKER.

Application filed November 16, 1921. Serial No. 515,601.

*To all whom it may concern:*

Be it known that I, FRANK M. TOMPKINS, a citizen of the United States, residing at Duffield, in the county of Scott and State of Virginia, have invented certain new and useful Improvements in Fruit Pickers, of which the following is a specification.

This invention relates to fruit pickers and has for its object the provision of a light, cheap and durable device by the use of which fruit may be readily harvested without bruising or otherwise injuring the same and without requiring the operator to climb the fruit trees or ascend ladders. The invention is illustrated in the accompanying drawings and will be hereinafter fully set forth.

In the drawing—

Figure 1 is a perspective view of a fruit picker embodying my invention;

Fig. 2 is an enlarged perspective view of the fruit-stripping member;

Fig. 3 is an enlarged detail perspective view of the hand lever whereby the stripping member is actuated.

In carrying out my invention, I provide a tubular casing or conducting tube consisting of a plurality of wires or light rods 1 which extend in circular formation to any desired height and are connected at intervals by hoops or circular bands 2 whereby the circular arrangement of the rods is maintained. To the lowermost hoop 2, I attach a tube 3 of canvas or other flexible material having the requisite durability and this tube in actual practice, is attached to the mouth of a bag carried upon the shoulder of the operator, the bag not forming an essential part of the invention and, therefore, being omitted from the drawings. To attach the tube or spout 3 to the rigid tubular casing, I provide at the end of the flexible spout a plurality of tongues 4 which are carried upwardly within the lowermost hoop 2 and then folded over said hoop between the longitudinal wires 1 and fastened to the body of the spout by buttons or any other convenient devices, as indicated at 5. To maintain the shape of this spout at its point of connection with the metallic tubular casing, I provide the spring arms 6 which have their upper ends secured to the lower hoops 2 and between their ends are curved so as to extend laterally from the metallic tube or casing. The ends of the spring arms 6 remote from the said casing are attached to a flexible reinforcing strap 7 which is arched over the spout 3 and secured thereto in any convenient manner so that the shape of the spout will be maintained at the point where it receives the impact of the dropping fruit, bruising of the fruit and excessive wear upon the spout being thus avoided.

Some of the wires or light rods 1, which constitute or define the tubular casing, terminate at the uppermost hoop 2, while others extend beyond said hoop and have their extremities united to a rim 8, a space, indicated at 9, being thus provided to permit the tubular casing to be readily fitted around a fruit which is to be harvested. It will, of course, be understood that the wires 1 are disposed at the inner sides of the hoops so that the interior of the casing will be smooth and will not present obstructions to the downward passage of the harvested fruit. Mounted for rocking movement upon the uppermost hoop 2 is a fruit stripper 10 which as shown clearly in Fig. 2, consists of a single strand of wire doubled upon itself to present a plurality of bights or fingers 11 having a slightly dished formation. It will be noted that the fingers decrease successively in length from the central fingers to the end fingers and that the extremities of the wire strand are extended relative to the fingers and terminate in eyes 13 pivotally engaging the fulcrum rod 12 carried by the uppermost hoop 2. The wire strand which is bent into shape to form the stripper is also formed at its center to project angularly from the bases of the central fingers 11 and present a crank arm 14 which projects upwardly and outwardly from the stripper when the latter is in its normal position. A spring 15 is coiled about the fulcrum rod 12 and has one end formed into a hook 16 engaged around one of the rods or wires 1 and its opposite end formed into a hook 30 engaged over one side of a bail 31 which is mounted for rocking movement upon the fulcrum rod 12. The intermediate portion of the bail bears upon the fingers so that the force of the spring is exerted to maintain the stripper in its lowered position. To the outer end of the crank arm 14, I attach the upper end of the pull wire or rod 17 which has its lower end secured to a cam or short lever 18 which is pivoted upon a base plate 19 near the upper end thereof which plate, in turn, is secured to adjacent hoops 2, as will be readily understood on reference to Fig. 1. At the upper end of the base plate 19, I pivotally attach a handle member 20 which is provided with a longitudinal slot 21 near its pivot through which the pull wire 17 may pass. A second handle 22 is provided at a point remote from the handle 20 and it will be generally found advantageous to locate the handle 22 at least a distance of forty-five degrees upon the circumference of the tubular casing from the handle 20. In the drawings, I have shown the handle 22 as formed by doubling one of the longitudinal wires 1 upon itself around adjacent hoops 2 with the intermediate portion of the handle wrapped upon itself to form a gripping surface.

In the use of the device, the main tubular casing or wire frame has its upper end brought into position around the fruit while pressure is exerted upon the handle 20 to force the lever or cam 18 close to the base plate 19 thereby pulling upon the wire or cable 17 and raising the stripper. Under the influence of the spring 15, the cam 18 normally stands out from the base plate 19 so that it bears constantly against the under side of the lever handle 20. Slight pressure of the operator's fingers upon the handle 20 will effect movement of the cam toward the casing and hold the cam to the casing so as to maintain the stripper in an upright or open position, the pull wire being, at this time, clamped between the outer surface of the cam and the inner surface of the handle. The stem of the fruit is caught between adjacent fingers of the stripper and the pressure upon the handle 20 is then released, whereupon the spring 15 will return the stripper to its lowered position, shown in Fig. 1, and thereby strip the fruit from the tree. The device will be supported while being brought into position around the fruit by the handles 20 and 22 and the handle 20 may be given such shape or inclination as will most conveniently enable the operator to firmly hold the picker while at the same time permitting the stripper to operate efficiently. My improved fruit picker is exceedingly simple in the construction and arrangement of its parts; it may be carried for a considerable period without producing excessive fatigue in the operator and by its use fruit may be rapidly stripped from a tree and delivered into a bag carried by the operator without loss or damage.

Having thus described the invention, what is claimed as new is:

1. A fruit picker, the combination of a tubular casing adapted at its upper end to encircle a fruit to be harvested, a stripper mounted in the upper end of the casing and consisting of a single wire strand having its ends pivotally mounted upon the casing and its intermediate portion presenting parallel spaced fingers, means carried by the casing for yieldably holding the stripper in a lowered position with its fingers extending across the casing, and manually operable means mounted on the casing for withdrawing the stripper from across the casing.

2. In a fruit picker, the combination of a tubular casing, means at the upper end of the casing to strip fruit from a tree, a flexible spout connected with the lower end of the casing and leading therefrom, and yieldable sustaining members extending longitudinally of the spout externally thereof and attached at one end to the lower end of the casing and at the opposite end to said spout at a point spaced from the casing.

3. In a fruit picker, the combination of a tubular casing, a stripper finger mounted for rocking movement at the upper end of said casing, a crank extending from said stripper, a cam mounted upon the casing near the lower end thereof, a pull wire connecting said cam with said crank, and a handle member mounted upon the casing and bearing upon the outer end of said cam and having a longitudinal slot through which the pull wire passes.

4. In a fruit picker, the combination of a casing consisting of a pluralty of longitudinal rods, and hoops encircling and secured to the rods, some of the rods extending above the uppermost hoop, a stripper mounted on the uppermost hoop for rocking movement, yieldable means carried by said hoop for holding the stripper normally lowered across the end of the casing, and a handle mounted on the casing near the lower end thereof and operatively connected with the stripper to raise the same.

In testimony whereof I affix my signature.

FRANK M. TOMPKINS [L. S.]